United States Patent [19]

Frost et al.

[11] 4,213,523
[45] Jul. 22, 1980

[54] CONVEYOR ROLLER ASSEMBLY

[75] Inventors: Charles C. Frost, Ada; Siegfried K. Weis, Byron Center, both of Mich.

[73] Assignee: C. L. Frost & Son, Inc., Grand Rapids, Mich.

[21] Appl. No.: 941,176

[22] Filed: Sep. 11, 1978

[51] Int. Cl.$^2$ ............................................. B65G 39/09
[52] U.S. Cl. .................................................... 193/37
[58] Field of Search ................. 193/37, 35 R; 308/20, 308/236, 237 R, 237 A, 239; 198/780, 842; 29/116 R

[56] References Cited

U.S. PATENT DOCUMENTS

| | | | |
|---|---|---|---|
| 714,432 | 11/1902 | Alvey | 308/20 |
| 1,241,324 | 9/1917 | Alvey | 308/20 |
| 1,425,561 | 8/1922 | Wego | 308/20 |
| 1,784,848 | 12/1930 | Reichle | 308/20 |
| 4,078,642 | 3/1978 | Payne | 193/37 |
| 4,148,386 | 4/1979 | Bradbury | 193/37 |

Primary Examiner—Robert B. Reeves
Assistant Examiner—Gene A. Church

Attorney, Agent, or Firm—Price, Heneveld, Huizenga & Cooper

[57] ABSTRACT

A roller assembly for use in gravity roller and power roller conveyors, especially those used in sanitary applications such as for food processing and the like. The roller assembly prevents contaminants from entrapment within the roller or associated parts and may be repeatedly washed or steam cleaned without corrosion or degradation. Preferably, wear-resistant, corrosion-resistant, organic, polymeric plastic, bearing inserts are axially and rotationally retained by retaining means within openings in the opposite ends of a corrosion-resistant roller. At least one of the roller end opening or the insert at each end includes a bottom wall closing off the roller interior and providing a thrust resisting surface. Preferably, the inserts receive stainless steel support shafts which have rounded ends engaging the bottom wall to resist axial thrust on the roller. In the preferred form, the bearing inserts have curved, shaft-engaging surfaces to facilitate and maintain low-drag, rotational support even when the roller is deflected during loaded operation.

24 Claims, 11 Drawing Figures

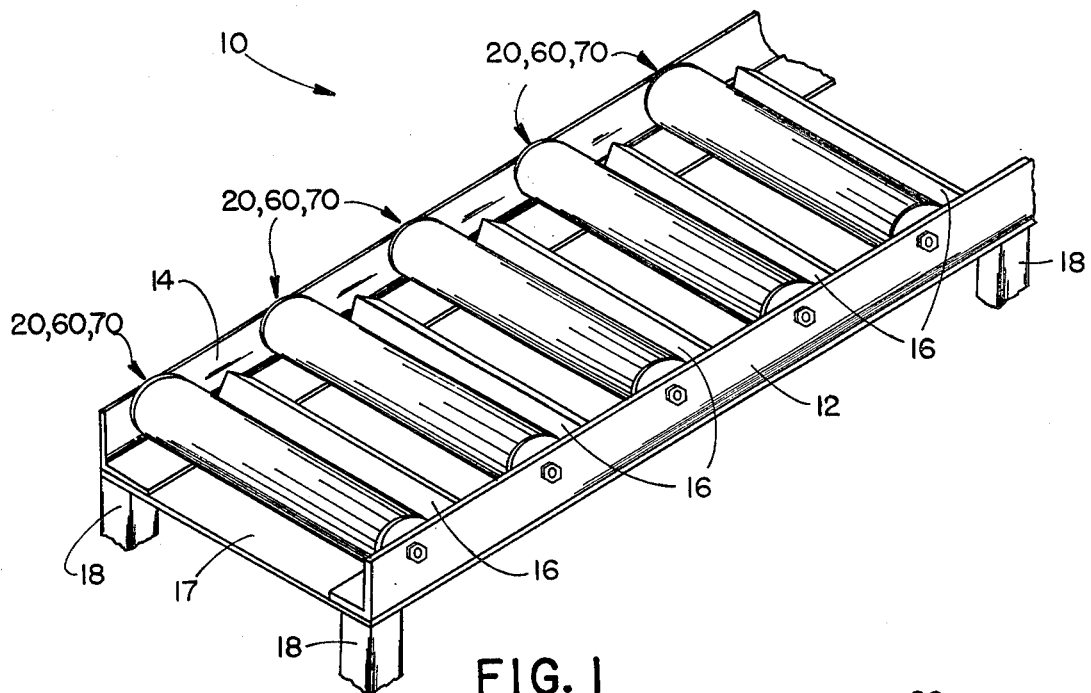
FIG. 1
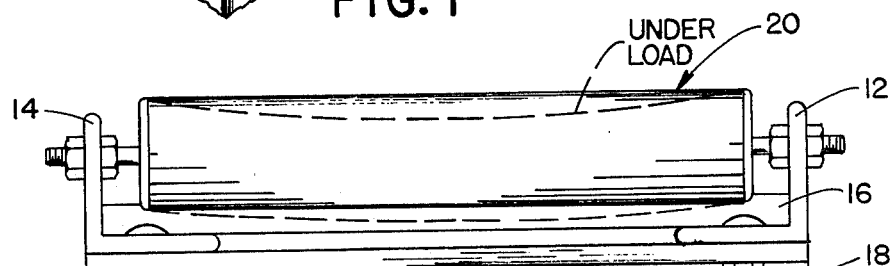
FIG. 2
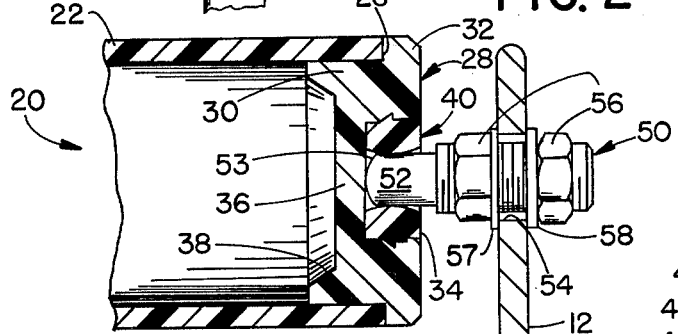
FIG. 3
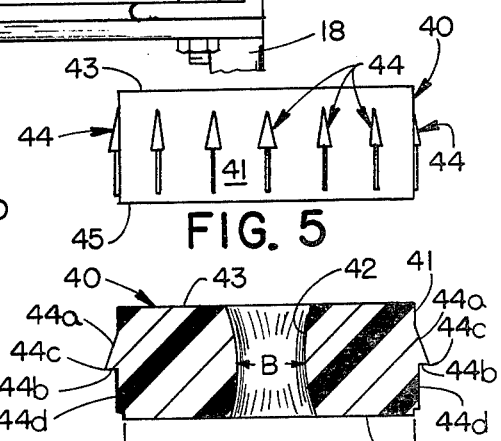
FIG. 5
FIG. 6
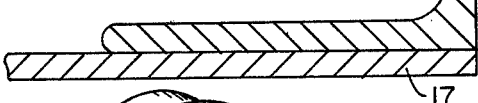
FIG. 4

CONVEYOR ROLLER ASSEMBLY

BACKGROUND OF THE INVENTION

This invention relates to roller assemblies for gravity and power roller conveyors and, more particularly, to a low-friction, self-lubricating, corrosion-resistant and contamination-resistant roller assembly especially useful in sanitary roller conveyor applications.

An important problem in the use of conveyor rollers in sanitary roller conveyor applications is the ability to prevent the buildup of contaminants such as food particles and the like in crevices and interiors of parts such as the rollers and support mechanisms. In order to prevent such contamination, the roller conveyors are frequently washed or steam cleaned which subjects them often to caustic and corrosion-inducing fluids and materials.

Of the many previously known roller assemblies for gravity and power roller conveyors, a few of the more recent structures have utilized organic, polymeric plastics to form both the rollers and the closure pieces for the ends of the rollers to rotationally support them. Although such conveyor rollers have been easier to clean, the use of organic plastic corrosive-resistant parts made from such materials has often reduced the load rating of such conveyor rollers as compared to prior all-metal or steel roller assemblies. In addition, such organic plastic, corrosive-resistant materials are often less rigid and allow greater overall roller deflection when loaded than prior all metal assemblies. Such deflection upon loading can cause, in certain circumstances, greater drag and friction and consequently more binding, heat buildup and wear. Further, the prior structures have not always been well-suited to resist axial thrust exerted along the axis of the roller while also adequately rotationally supporting the roller.

Other previously known conveyor rollers have been made exclusively or predominantly from metal. Many of such structures include many openings and spaces which are very difficult to keep clean. Also, the metal itself is subject to corrosion which further reduces its desirability for sanitary applications. Use of entire stainless steel rollers and bearings is also undesirable because of the high cost and expensive machining requirements of such steel.

Some previously known roller assemblies of metal or other materials have used support inserts which move either axially or rotationally. Such supports do not adequately prevent wear, especially when the rollers are operated under load, and do not prevent or reduce contamination for sanitary purposes.

The present roller assembly was invented as an improvement over the prior known roller assemblies in order to overcome the above problems.

SUMMARY OF THE INVENTION

Accordingly, the present invention provides a roller assembly for gravity and power roller conveyors, especially those used in sanitary applications such as for food processing and the like. The invention eliminates contamination by food retention in the roller and supporting structure and enables frequent and repetitive washing and steam cleaning without corrosion or degradation to maintain the roller in a highly sanitary condition. The roller assembly utilizes corrosion-resistant materials, preferably organic, polymeric plastics in combination with stainless steel. This provides high strength, low friction and an excellent load rating versus its cost of manufacture and corrosion-resistance capability when compared with prior known structures.

In one form, the invention provides a roller assembly including a roller having a central axis and opposite ends. Each end has a central opening coaxial with the roller which receives a bearing insert means for receiving and supporting an axle or a support shaft. Each bearing insert means includes a circular opening coaxial with the roller. The outer periphery of the insert includes retaining means preventing axial and rotational movement of the bearing insert in the central opening. A bottom wall is included in at least one of the roller central opening and bearing insert opening at each end of the roller to close the assembly and provide a thrust resisting surface.

In the preferred embodiment, stainless steel support shafts are journaled in preferably organic, polymeric plastic bearing inserts to provide a rotational and thrust-bearing support which reduces or eliminates the need for external lubrication, is less expensive and more durable than prior known journal and ball-bearing type conveyor rollers, and yet is easily assembled, disassembled, or adjusted in place. Separate formation of the bearing inserts and support shafts from higher cost, more wear-resistant materials enables lower overall assembly cost while maintaining load capabilities because the remainder of the assembly can be made from lower cost materials. The assembly provides high load-bearing capabilities while keeping drag and rotational torque at a minimum because the axially and rotationally retained bearing inserts have curved support surfaces forming bell-mouth openings which enable low-friction rotation even when the roller is deflected during operation.

Further, in a preferred form, the bearing insert opening has an annular, radially inwardly curved surface defining a minimum diameter and larger diameters on either side thereof. Also, the roller, bearing inserts and bottom walls are formed from corrosion-resistant materials and enable ease in cleaning of the roller.

In other aspects, a pair of support shafts, which are generally cylindrical, are retained one in each bearing insert. The diameter of the shaft is closely matched to that of the minimum diameter of the insert opening and the shaft includes a convex, curved end which engages the bottom wall to resist thrust along the roller axis.

The retaining means on the bearing insert preferably include spaced, tapered fins which include sharp edges for engaging the sides of the central opening to retain the inserts against axial and rotational movement.

The closed nature of the present invention prevents contaminants from building up within the roller assembly and enables ease in cleaning of the roller and the bearing-support areas. Use of a separate bearing insert formed from wear-resistant, corrosive-resistant, preferably organic, polymeric plastic enables lower assembly cost, greater durability and longer life than certain prior roller assemblies without external lubrication inasmuch as the self-lubricating insert is engaged by a stainless steel shaft which itself is wear and corrosion-resistant. Fluids, such as water, used during any processing carried on with the conveyor, and any residual water left from cleaning the assembly, in fact, serve as lubricants for such materials. As compared to previously known structures, the present assembly is less expensive to build while retaining corrosion-resistant properties and high load capabilities while maintaining low-friction, low-drag characteristics.

These and other objects, advantages, purposes and features of the invention will become more apparent from a study of the following description taken in conjunction with the drawings.

BRIEF DESCRIPTION OF THE DRAWINGS

FIG. 1 is a fragmentary, perspective view of a gravity roller conveyor utilizing roller assemblies of the present invention;

FIG. 2 is an end elevation of the gravity roller conveyor shown in FIG. 1;

FIG. 3 is a fragmentary, sectional view of one end of the roller assembly shown in FIG. 2;

FIG. 4 is a perspective, exploded view of the roller end plug and bearing insert prior to assembly;

FIG. 5 is a side elevation of the bearing insert of the present invention;

FIG. 6 is a sectional view taken along a diameter of the bearing insert;

DESCRIPTION OF THE PREFERRED EMBODIMENTS

Figures 7, 8:
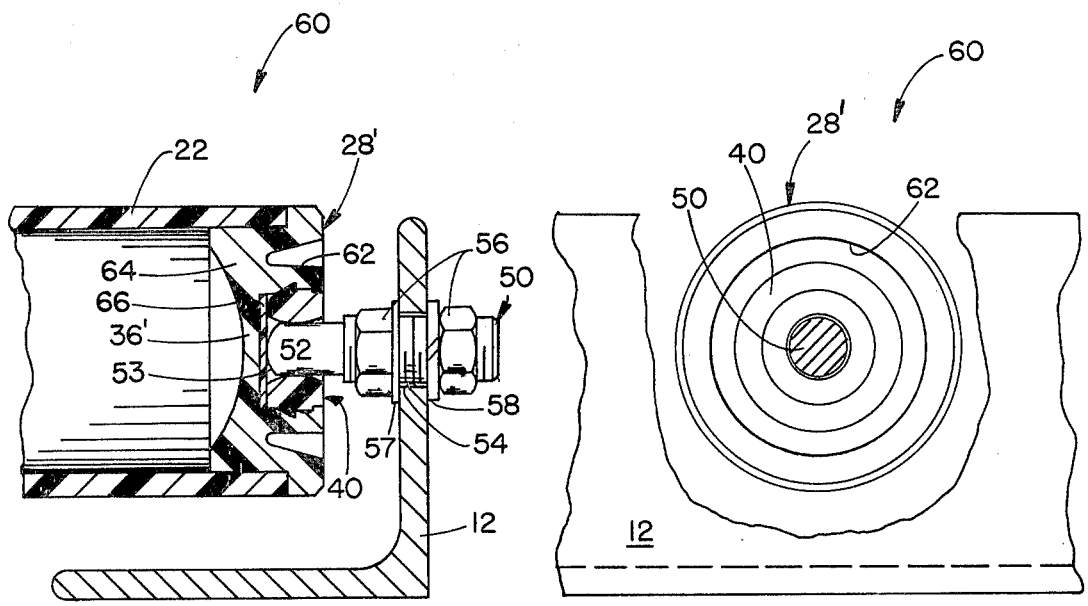
FIG. 7 is a fragmentary, sectional, side elevation of a modified form of the roller assembly of the present invention.
FIG. 8 is an end elevation of the roller assembly shown in FIG. 7.

Referring now to the drawings in greater detail, FIGS. 1 and 2 illustrate a typical conveyor application of the roller assemblies 20, 60 and/or 70 of the present invention wherein the rollers are secured parallel to one another at spaced positions along end supports to form a gravity roller conveyor 10. Conveyor 10 includes a pair of roller support rails 12, 14 which are parallel to one another and extend along and adjacent to the ends of the rollers which traverse the space therebetween. The support rails 12, 14 are braced and separated by angle irons 16 welded or otherwise secured therebetween intermediate the rollers and below the top surfaces thereof. A plate 17 may underlie the extent of the rollers although the same is not necessary when braces 16 are used. The entire assembly may be supported on legs 18 or other supports such that one end of the assembly is higher than the other and objects supported atop the series of roller assemblies 20, 60 and/or 70 suspended between rails 12, 14 will travel downhill via gravity while supported by the rollers.

Each of the roller assemblies 20 includes a tubular roller 22 having a hollow interior 24 and planar ends 26. Preferably, the tubular rollers 22 are formed from a corrosion-resistant, organic, polymeric, thermoplastic material such as polyvinyl chloride (PVC) typically having a thickness of approximately 0.20 inches and a specific gravity of 1.3 to 1.58. Although PVC is preferred, other lightweight, corrosion-resistant materials, including some metals such as aluminum, could be used.

As shown in FIG. 3, received in each end of roller 22 is a circular plug end 28 including a cylindrical inner body 30 having an annular, larger diameter outer flange 32 which abuts the planar end surface 26 of roller 22. The outer diameter of inner body portion 30 is closely matched to the inner diameter of roller 22 to fit tightly therewithin while the rear side of annular flange 32 is itself planar. Plug end 28 thus fits tightly within and completely closes and seals the end of roller 22 leaving no cracks or crevices into which contaminants can enter and buildup. The outer circumferential surface of the roller 22 is flush with the outer surface of flange 32. As shown in FIGS. 3 and 4, plugs ends 28 also preferably include blind central openings 34 which are cylindrical openings extending only partially through the plug end to maintain closure and sealing of the roller interior. Central portion 36 of the plug end forms a bottom wall, the thickness of which is typically about 0.187 inches. The outer end surfaces of plug ends 28 are planar and preferably perpendicular to the roller axis.

Figure 9:
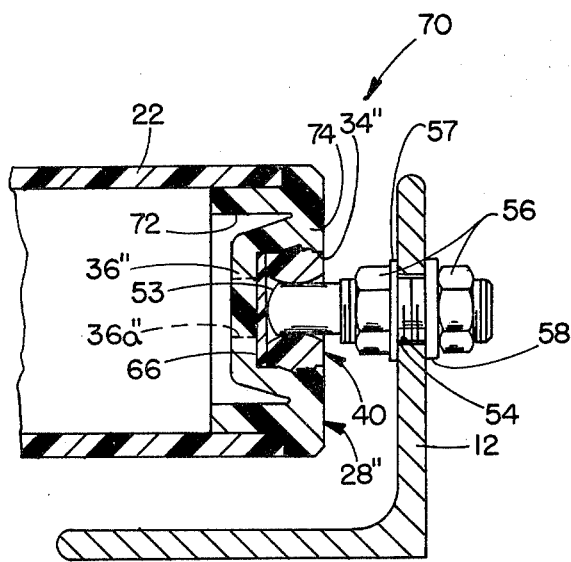
FIG. 9 is a fragmentary, sectional, side elevation of a third modified embodiment of the roller assembly of the present invention.

Alternately, plug ends 28 could be molded in one piece with a roller 22' such that both roller ends include closed, blind openings 34 with bottom walls 36 for receipt of inserts 40 as explained below. (See FIG. 11) Blow molding is an example of such a process. Further, as explained below, the central openings in the roller end (FIG. 11) or plug end 28 need not be blind but can be open (shown in phantom in FIGS. 9 and 11) to the roller interior and closed with a bottom wall on the bearing insert (FIG. 10) or a separate disc (FIG. 9).

As shown in FIGS. 3–6, a generally cylindrical bearing insert 40 has an outside diameter (denoted by "A" in FIG. 6) which is closely matched to the inner diameter of the central opening 34 in plug end 28. Insert 40 includes a cylindrical outer peripheral surface 41 and a central opening 42 extending entirely therethrough which is coaxial with plug end 28 and roller 22 when assembled. Central opening 42 includes generally axially extending, side surfaces which are radiused or curved and annular such that the opening is bell-mouth shaped on either end and has a minimum diameter at the center of the insert (diameter "B" in FIG. 6), which diameter gradually increases and becomes larger progressively outwardly toward either end surface 43, 45 of the insert. As will be described more fully below, these curved, annular surfaces of opening 42 enable low-friction, low-drag rotational support of the roller assembly even when deflected under load in operation.

Also included on peripheral surfaces 41 of bearing insert 40 are a series of retaining projections 44 which prevent both axial and rotational movement of the insert in opening 34. Projections 44 extend generally parallel to the axis of the insert and roller and are spaced from one another equally about the cylindrical periphery of the insert. Projections 44 include rounded, tapered, wedge-like fins 44a, which are actually in the shape of halves of cones, the apexes of which extend in a direction parallel to the axis of the insert. Tapered fins 44a gradually increase in height toward the center of the insert and include flat, radial faces 44b which lie in a common plane at the center of the insert. The edges 44c between the rounded top surface of projecting fins 44a and faces 44b are sharp and deform and engage or dig into the sides of the opening 34 in plug end 28 to both prevent axial movement or "walking" of the insert out of the opening as well as rotation of the insert around in the opening. Facilitating resistance to rotation are extending, rectilinear ribs 44d which extend from faces 44b toward side 45 of the insert 40, i.e., the outside surface when the insert is installed. These ribs also engage the sides of the opening to prevent rotation.

Inserts 40 are preferably formed from a moldable, wear-resistant, corrosion-resistant, organic, polymeric thermoplastic material such as Delrin 500 CL (Trademark of the E. I. DuPont de Nemours & Co., Wilmington, Delaware). Delrin 500 CL is a self-lubricating, acetal, homopolymer resinous plastic. Plug ends 28 are preferably formed from the same PVC used for the preferred roller 22. The Delrin 500 CL inserts are harder, more wear-resistant, and have a higher pressure vs. velocity factor than PVC and yet are easily molded to include projections 44. The softer, less rigid PVC plug ends facilitate accommodation of deflection when the rollers are loaded, as explained below, yet suitably retain the inserts 40 to maintain proper bearing support. Although the thermal expansion rate of Delrin 500 is approximately within the range of 1 to 2 times that of PVC, the two materials are compatible in the present structure.

Assembly of roller 22, plug ends 28 and bearing inserts 40 is accomplished by applying a coating or layer of suitable solvent adhesive to the outer periphery of body portion 30 of plug end 28 as well as the radially extending planar surface at the rear side of annular flange 32 and inserting the plug end within the hollow open end of one end of roller 22. A suitable adhesive for this purpose is Nadone (Trademark of Allied Chemical Corporation), a bonding adhesive for polyvinyl chloride using a base chemical of cyclohexanone. When both plug ends have been inserted and secured in the roller, inserts 40 are pressed with a mechanical press or otherwise inserted into openings 34 until their inner sides 43 abut the bottom walls 36 of the plug ends. The insert 40 is inserted with the apexes of tapered fins 44 pointing inwardly so that the wedge shape facilitates insertion. The sharp edges 44c and radially extending faces 44b thereafter engage the sides of the opening in the plug end and prevent withdrawal of the bearing insert.

As is best seen in FIG. 3, a rigid, threaded, cylindrical support shaft or axle 50 having a cylindrical bearing or support surface 52 at its inner end is secured through a suitable aperture 54 in the vertical portion of each side support rail 12, 14 to support the roller assembly. Bearing surface 52 has a diameter, for example 0.312 inches, matched to be slightly smaller than the minimum diameter indicated at "B" in FIG. 6 at the center of the insert opening 42, for example 0.325 inches. The extreme, inner end surface 53 of shaft 50 is convexly outwardly curved, preferably in a spherical shape, and engages the bottom wall 36 of plug end 28 to resist axially exerted forces or "thrust" forces along the roller. Contact between the minimum diameter portion shown at B in FIG. 6, and the bearing support portion 52 of shaft 50 closely approximates a planar contact thereby reducing rotational drag and friction to a minimum. With light loads, the bell-mouth opening 42 provides such approximate planar contact and thus low torque and drag. With heavier loads, plastic deformation of the side surfaces of opening 42 provides somewhat greater surface contact but higher load capacity. Moreover, the metal-plastic combination of stainless steel supporting and around which a Delrin 500 CL plastic journal bearing rotates is a low-friction combination requiring little or no lubrication having along life and producing minimal wear.

Shafts 50 are spaced along the rails as shown in FIG. 1 and are secured in place by nuts 56, washers 57 and lock washers 58 in vertically elongated apertures 54. The root diameter of the threads of the shaft 50 is slightly larger than the diameter of bearing surface 52 to enable insertion of the shafts through openings 54 in rails 12, 14 and nut 56 on the inside of the rail when the rails are fixed. Adjustment of nuts 56 changes the axial extension of shafts 50 and, thus, the force with which shaft ends 53 engage walls 36. The vertical elongation of apertures 54 allows vertical adjustment of the height of the roller assembly with respect to the top of the rails 12, 14. Since the end 53 of shaft 50 is smoothly curved, rotation of the rollers even when thrust forces are exerted along the axes of the rollers, as often occurs in operation, does not unduly wear the bottom wall 36. However, if desired, an additional anti-friction, wear-reducing disc can be inserted therebetween as shown in FIGS. 7 and 9.

Important properties of the above support arrangement will now be understood. As is best shown in phantom in FIG. 2, when a load to be conveyed is placed on the roller or a series of rollers, and especially at approximately the center of the roller assemblies, the rollers are deflected downwardly. That deflection causes pivotal movement of plug end 28 and bearing insert 40 about an axis perpendicular to the axis of shaft 50 which is axially and rotationally secured therein. However, because of the curved surfaces 42 in insert 40, and the curved end 53 on shaft 50, the roller can continue to rotate about the shaft, and especially bearing surface 52, in approximately the same low-friction, low-drag manner as when the roller is undeflected. These cooperating, curved surfaces allow the slight pivoting or rocking motion to occur during roller deflection while continuing only minimal rotational bearing contact between the insert 40 and shaft 50. In addition, the curved surfaces enable cleaning fluids and steam to penetrate the bell-mouth opening 42 to the bottom wall of the plug end, roller or bearing insert or thrust disc 66, as explained below, and clean out any undesired contaminants.

As shown in FIGS. 7 and 8, where like numerals indicate like parts, another embodiment 60 of the present invention includes a tapered, annularly shaped recess 60 in the outer end surface of plug end 28' which is secured in the end of roller 22 in the same manner as described above in connection with embodiment 20. Annular opening 62 tapers inwardly from the larger opening at the end surface to facilitate cleaning and forms a reduced thickness annular section 64 spaced inwardly and radially outwardly of the end 53 of shaft 50. When assembly 60 is loaded and the center thereof deflects downwardly, reduced thickness portion 64 of plug end 28' allows deflection of roller 22 and the above-described rotation without greatly altering the contact relationship between bearing insert 40 and shaft 50 or the end 53 of the shaft and bottom wall 36'.

As mentioned above, further reduction in friction and drag and prevention of wear at bottom wall 36' can be accomplished by including a solid, circular disc 66 formed from a wear-resistant, corrosion-resistant, organic, polymeric plastic such as Teflon (Trademark of E. I. DuPont de Nemours & Co.), Delrin 500 CL (the same material from which insert 40 is formed) or ultra-high molecular weight polymeric plastic. Typically, disc 66 will have a thickness of approximately 0.030 inches and will have anti-friction or friction-reducing properties such as self-lubricity as in the case of Teflon. Disc 66 provides longer and more durable thrust bearing capabilities for the roller assembly. Otherwise, embodiment 60 is the same as embodiment 20 described above.

A third embodiment 70 of the invention (FIG. 9), where like numerals indicate like parts, is similar to embodiment 60 except for the inclusion of a slightly modified plug end 28″ which includes a tapered, annular recess 72 extending inwardly of the plug end from the inner side of the roller assembly. Annular opening 72 tapers inwardly toward the outer surface of the plug end but ends leaving an annular, reduced thickness section 74 which facilitates flexure of the plug end when roller 22 is deflected during loading as described above. Again, with plug end 28″, more normal bearing contact between insert 40 and bearing surface 52 of shaft 50 is maintained even though the roller assembly is loaded.

As in embodiment 60, an additional thrust bearing disc 66 of the type described above may be used between end 53 of shaft 50 and bottom wall 36″ of plug end 28″. The elimination of any recesses extending inwardly from the outer surfaces of plug end 28″ eliminates further areas where contaminants might be retained. Like embodiments 20 and 60, however, the curved engaging surfaces 42 of insert 40 facilitate proper rotational movement even under load by allowing pivotal movement of plug end 28″ should the deflection be more than can be accommodated by the reduced thickness area 74 of the plug ends. The rear surfaces within the rollers of all three plug ends 28, 28′ and 28″ are recessed for weight reduction and material saving purposes.

Also, opening 34″ could include a reduced diameter portion 34a″ extending entirely through plug end 28″ (FIG. 9) or the closed end of roller 22′ (FIG. 11) if it is formed in one piece with the roller. In this case, the solid disc 66 is inserted against a shoulder 37″ and abutted by insert 40 to hold disc 66 in position.

Figure 10:
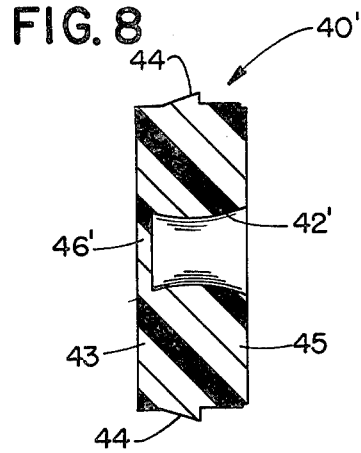
FIG. 10 is a sectional view of a modified form of the bearing insert including a bottom wall integral and in one piece therewith.
Figure 11:
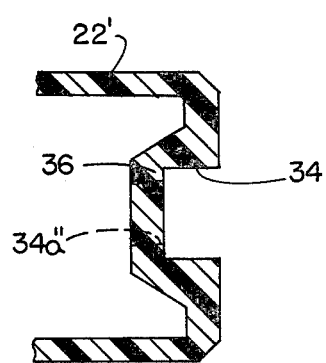
FIG. 11 is a fragmentary, sectional view of a modified roller including an integral end.

Alternately, a modified form 40′ of insert 40 could be used with plug ends 28″ or roller 22′ including through openings 34a″. As shown in FIG. 10, where like numerals indicate like parts to insert 40, insert 40′ has an integral, solid, bottom wall 46′ closing and forming a blind, bell-mouth opening 42′ at the inside end surface 43. Bottom wall 46′, like disc 66 or bottom wall 36 in the other embodiments, closes the interior of the roller and provides a thrust resisting surface for shaft end 53. Insert 40′ is either molded or machined, depending on the material desired, to include the blind bell-mouth opening 42′.

Alternately, plug ends 28, 28′, 28″ could be molded around insert 40 including projections 44. The molded PVC of plug ends would thus intimately contact fins 44a, faces 44b, edges 44c and ribs 44d to prevent both axial and rotational movement of the insert in the plug end. To perform such molding, a disc such as 66 would be held against the inner end surface 43 of insert 40 and plug end 28, 28′, or 28″, and specifically bottom wall 36, 36′, or 36″ formed around the disc-insert combination.

As is evident, other supports besides right angle rails can be used to support shaft 50 and the various roller assemblies without deviating from the spirit of this invention. In addition, the diameter of shaft 50 and especially bearing contact surface 52 of that shaft could be increased for longer life since a larger diameter will result in less overall wear on the shaft.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. A roller assembly for roller conveyors comprising:
   a roller having a central axis and opposite ends, each end having a central opening coaxial with said roller;
   a bearing insert received in each of said central openings, each insert including a circular opening coaxial with said roller for receiving and being rotatably supported by a cylindrical support shaft and retaining means on the outer periphery of said insert for preventing axial and rotational movement of said bearing insert in said central opening, said circular bearing insert opening having an annular, radially inwardly convex, curved surface defining a minimum diameter and larger diameters on either side of said minimum diameter and providing a bell-mouth shape facing outwardly of said roller end, said circular bearing insert opening adapted to receive and cooperate with a cylindrical support shaft to enable low friction, low drag rotational support of said roller assembly even when deflected under load in operation;
   a bottom wall in at least one of said roller central opening and said bearing insert opening at each end of said roller for closing the roller assembly and providing a thrust resisting surface.

2. The roller assembly of claim 1 wherein said retaining means on each of said bearing inserts include a plurality of spaced projections which engage the sides of said central opening.

3. The roller assembly of claim 2 wherein said projections are tapered, wedge-like fins extending generally parallel to said roller axis, said fins increasing in height in a direction toward the outer end surface of said roller and bearing insert, each fin having a sharp edge for resisting withdrawal of said insert from said central opening.

4. The roller assembly of claim 3 wherein said projections further include ribs extending from said fins toward said outer end surface of said roller and bearing insert to help prevent rotation of said insert in said central opening.

5. The roller assembly of claim 2 wherein the sides of said circular bearing insert opening have a cross-sectional shape of a portion of a circle and form a bell-mouth opening at each end surface of the insert, the minimum diameter between said sides being at the center of said insert.

6. The roller assembly of claim 1 wherein said central opening at each roller end is blind and extends only partially through said roller end to said bottom wall; said bottom wall being formed integrally and in one piece with said roller end.

7. The roller assembly of claim 1 wherein said bearing insert includes said bottom wall in one piece therewith, said bearing insert opening extending only partially through said insert.

8. The roller assembly of claim 1 wherein said bottom wall is a disc inserted within said central opening intermediate said bearing insert and a portion of said roller end forming said central opening.

9. The roller assembly of claims 1, 6, 7 or 8 wherein said roller has an opening at each end; a pair of plug ends, one plug end received in and closing each end of said roller, each plug end including one of said central openings receiving one of said bearing inserts.

10. The roller assembly of claim 9 wherein said plug ends are formed from a corrosion-resistant, organic, polymeric plastic; said bearing inserts being formed from a corrosion-resistant, organic, polymeric plastic which is harder and more wear-resistant than the plastic of said plug ends.

11. The roller assembly of claim 1 wherein said roller has an opening at each end; a pair of plug ends, one plug end received in and closing each end of said roller, each plug end including one of said central openings receiving one of said bearing inserts; each of said plug ends including an annular recess concentric with said roller axis providing a reduced thickness area facilitating flexing of said plug to permit proper bearing contact when said roller is loaded.

12. The roller assembly of claim 11 wherein said recess is intermediate said central opening and the outer periphery of said plug end, tapers inwardly from an annular opening at the outside surface of said plug end, and extends only partially through said plug end.

13. The roller assembly of claim 11 wherein said recess is intermediate said central opening and the outer periphery of said plug end, tapers inwardly from an annular opening at the inside surface of said plug end, and extends only partially through said plug end.

14. The roller assembly of claim 1 including a pair of cylindrical roller support shafts and means for supporting such shafts adjacent opposite ends of said roller, each shaft having a support surface with a diameter closely matched to that of said minimum diameter of said bearing insert opening and a convexly curved end, each shaft received in and rotatably supporting one of said bearing inserts with its convex end engaging said bottom wall to resist axial thrust along said roller.

15. The roller assembly of claim 14 wherein each of said support shafts includes a threaded end opposite said convexly curved end, the root diameter of the threads on said threaded end being larger than the diameter of said support surface of said shaft whereby said shaft may be inserted from the exterior of said means for supporting said shafts through an aperture in a portion thereof and fastened with nuts on either side of said means for supporting said shafts.

16. The roller assembly of claim 14 wherein said shafts are each bolted to a support rail through an oversize aperture in said rail to allow adjustment of the position of said roller with respect to the rails, said rails extending along either end of said roller.

17. The roller assembly of claim 14 wherein said central opening at each roller end is blind and extends only partially through said roller end to said bottom wall; said bottom wall being formed integrally and in one piece with said roller end; a thin disc of wear-resistant, organic polymeric plastic material in each of said central openings and abutting against the bottom wall of said opening, said convex shaft end engaging one side of said disc.

18. The roller assembly of claim 17 wherein said roller has an opening at each end; a pair of plug ends, one plug end received in and closing each end of said roller; each plug end including one of said central openings receiving one of said bearing inserts; said roller is formed from polyvinyl chloride thermoplastic material, said bearing insert being formed from an acetal resinous plastic and said shafts are formed from a corrosive-resistant metal such as stainless steel, said plug ends being secured in said roller with a suitable solvent adhesive such as that containing cyclohexanone.

19. A roller assembly for roller conveyors comprising;
a roller having a central axis and opposite ends, each end having a central opening having an interior surface and being coaxial with said roller;
bearing insert means for receiving and being supported by an axle received in each of said central openings, each bearing insert means including an opening coaxial with said roller and retaining means on its outer periphery for preventing axial and rotational movement of said bearing insert means in said central opening, said retaining means including a plurality of projections having sharp edges spaced outwardly of said outer periphery of said bearing insert means, said sharp edges engaging and being embedded in said interior surfaces of said central roller openings and resisting axial withdrawal and movement of said bearing insert means;
a bottom wall in at least one of said roller central opening and said opening of said bearing insert means at each end of said roller for closing the roller assembly.

20. A roller assembly for roller conveyors and especially sanitary roller conveyors, comprising:
a roller having a central axis and an opening at each end,
a pair of plug ends, one plug received in and closing each end of said roller, each plug having a blind central opening coaxial with said roller and extending partially through said plug end to a bottom wall;
a bearing insert received in each of said plug end openings and abutting said bottom wall, each insert including a circular opening coaxial with said roller extending entirely therethrough for receiving and being rotatably supported by a cylindrical support shaft and retaining means on the outer periphery of said insert for preventing axial and rotational movement of said bearing insert in said blind opening, said circular bearing insert opening having an annular, radially inwardly convex, curved surface defining a minimum diameter and larger diameters on either side of said minimum diameter and providing a bell-mouth shape facing outwardly of said roller end, said circular bearing insert opening adapted to receive and cooperate with a cylindrical support shaft to enable low friction, low drag rotational support of said roller assembly even when deflected under load in operation;
said roller, plug ends and bearing inserts formed from corrosive-resistant materials and enabling ease in cleaning of said roller.

21. A roller assembly for roller conveyors, and especially sanitary roller conveyors, comprising:
a roller having end surfaces and hollow portions coaxial with said roller at least at the ends thereof;
an organic, polymeric plastic plug end secured within each hollow end of said roller, said plug ends each having a body portion closely matched in size to said hollow roller ends to fit tightly therewithin, an annular flange abutting said end surface of said roller to limit insertion of said plug end in said roller, and a blind opening coaxial with said roller extending into the outer end surface of said plug end;

an organic, polymeric plastic bearing insert in said blind opening having a circular opening therethrough having a diameter varying from one side of said bearing insert to the other and coaxial with said roller, the diameter of said opening being a minimum at the center of said bearing insert and progressively increasing toward both of said sides to form an annular, radially inwardly curved, convex surface in said opening and bell-mouth ends on said insert opening, the outer periphery of said bearing insert including retaining means for preventing axial and rotational movement of said bearing insert in said blind hole;

a pair of stainless steel cylindrical support shafts each having a support surface with a diameter matched to that of said minimum diameter of said bearing insert opening, one shaft received in each of said bearing insert openings and a convex end surface on each of said shafts engaging the bottom of said blind hole and providing a thrust bearing for said roller, said curved insert openings and cylindrical support shafts cooperating to enable low friction, low drag rotational support of said roller assembly even when deflected under load in operation; and support means such as a rail for supporting said support shafts adjacent each end of said roller.

22. The roller assembly of claim 21 wherein said retaining means on each of said bearing inserts include a plurality of spaced projections which engage the sides of said blind central opening of said plug end.

23. The roller assembly of claim 22 wherein said plug end includes an annular recess concentric with said roller axis providing a reduced thickness area facilitating flexing of said plug to permit proper bearing contact when said roller is loaded.

24. The roller assembly of claim 23 including a thin disc of wear-resistant, organic, polymeric plastic material in each of said blind plug end central openings and abutting against the bottom wall of said opening, said convex shaft end engaging one side of said disc.

* * * * *